US012200844B2

(12) United States Patent
Tao et al.

(10) Patent No.: US 12,200,844 B2
(45) Date of Patent: Jan. 14, 2025

(54) SYSTEMS AND METHODS FOR WIRELESS INTRA-LUMINAIRE COMMUNICATION AND CONTROL OF SEPARATE LAMPS

(71) Applicant: SIGNIFY HOLDING B.V., Eindhoven (NL)

(72) Inventors: Haimin Tao, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 138 days.

(21) Appl. No.: 17/922,360

(22) PCT Filed: Apr. 30, 2021

(86) PCT No.: PCT/EP2021/061445

§ 371 (c)(1),
(2) Date: Oct. 29, 2022

(87) PCT Pub. No.: WO2021/228589

PCT Pub. Date: Nov. 18, 2021

(65) Prior Publication Data

US 2023/0180376 A1 Jun. 8, 2023

Related U.S. Application Data

(60) Provisional application No. 63/023,475, filed on May 12, 2020.

(30) Foreign Application Priority Data

Jun. 26, 2020 (EP) .................................... 20176418

(51) Int. Cl.
*H05B 47/19* (2020.01)
*H05B 45/375* (2020.01)
*H05B 47/105* (2020.01)

(52) U.S. Cl.
CPC .......... *H05B 47/19* (2020.01); *H05B 45/375* (2020.01); *H05B 47/105* (2020.01)

(58) Field of Classification Search
CPC ..... H05B 47/19; H05B 47/105; H05B 45/375
See application file for complete search history.

(56) References Cited

U.S. PATENT DOCUMENTS

| | | | | |
|---|---|---|---|---|
| 8,841,844 | B2 * | 9/2014 | Neuman | H05B 47/165 315/34 |
| 9,414,468 | B2 | 8/2016 | Knoedgen et al. | |
| 10,009,985 | B1 | 6/2018 | Huang | |
| 11,371,686 | B2 * | 6/2022 | Leermakers | F21V 23/0471 |

(Continued)

FOREIGN PATENT DOCUMENTS

| | | | |
|---|---|---|---|
| WO | 2015025267 | A1 | 2/2015 |
| WO | 2015060072 | A1 | 4/2015 |
| WO | 2018007282 | A1 | 1/2018 |

*Primary Examiner* — Raymond R Chai

(57) ABSTRACT

A mechanism for lamp to lamp communication within a luminaire. This is achieved by a field controller of a master lamp controlling the magnitude of an electric/magnetic field generated by a field generating element, where a slave lamp detects the electric/magnetic field using a field detection element. One of more properties of the light output by the slave lamp are dependent upon the detected electric/magnetic field, meaning that the master lamp is able to control the operation of the slave lamp.

16 Claims, 5 Drawing Sheets

(56) References Cited

U.S. PATENT DOCUMENTS

| | | | | |
|---|---|---|---|---|
| 11,386,763 | B2 * | 7/2022 | Pluimers | G08B 25/10 |
| 11,589,442 | B2 * | 2/2023 | Magielse | H05B 47/19 |
| 2008/0054729 | A1 * | 3/2008 | Greene | H02J 50/402 315/363 |
| 2012/0274208 | A1 * | 11/2012 | Chen | H01Q 1/44 315/34 |
| 2013/0285557 | A1 * | 10/2013 | Neuman | F21V 23/0471 315/152 |
| 2014/0103810 | A1 * | 4/2014 | Shaffer, II | H05B 47/19 315/316 |
| 2014/0191678 | A1 * | 7/2014 | Welten | H05B 45/375 315/193 |
| 2016/0088707 | A1 * | 3/2016 | Van De Sluis | H05B 47/175 315/297 |
| 2017/0048937 | A1 | 2/2017 | Wang et al. | |
| 2018/0248760 | A1 * | 8/2018 | Deixler | H04W 4/38 |
| 2018/0249539 | A1 | 8/2018 | Saccavini et al. | |
| 2018/0255626 | A1 | 9/2018 | Deixler et al. | |
| 2018/0263096 | A1 | 9/2018 | Deixler et al. | |
| 2019/0120471 | A1 | 4/2019 | Witty et al. | |
| 2020/0260561 | A1 * | 8/2020 | Yoshida | H05B 47/1965 |
| 2022/0304128 | A1 * | 9/2022 | Van De Sluis | H05B 47/1965 |

* cited by examiner

SYSTEMS AND METHODS FOR WIRELESS INTRA-LUMINAIRE COMMUNICATION AND CONTROL OF SEPARATE LAMPS

CROSS-REFERENCE TO PRIOR APPLICATIONS

This application is the U.S. National Phase application under 35 U.S.C. § 371 of International Application No. PCT/EP2021/061445, filed on Apr. 30, 2021, which claims the benefits of European Patent Application No. 20176418.0, filed on May 26, 2020 and U.S. Patent Application 63/023,475, filed on May 12, 2020. These applications are hereby incorporated by reference herein.

FIELD OF THE INVENTION

The present invention relates to the field of lighting installations, and in particular to lamps for luminaires of lighting installations.

BACKGROUND OF THE INVENTION

A luminaire (light fixture) is a device comprising at least one lamp for emitting illumination, and any associated socket, support and/or housing. A luminaire may take any of a variety of forms, such as a conventional ceiling or wall mounted luminaire, free standing luminaire or wall washer, or a less conventional form such as an illumination source built into a surface or an item of furniture, or any other type of lighting device for emitting illumination into an environment.

The lamp refers to an individual light-emitting component within a luminaire, of which there may be one or more per luminaire. The lamp may also take any of a number of forms, such as an LED-based lamp, a gas-discharge lamp, or a filament bulb. An increasingly popular form of lamp is a retrofittable LED-based lamp comprising one or more LEDs as the means by which to emit illumination, but being made retrofittable into a luminaire designed for a traditional filament bulb or fluorescent tube.

A luminaire or even an individual lamp may also be equipped with a wireless communication interface allowing the luminaire or lamp to be controlled remotely by lighting control commands received from a user device such as a smartphone, tablet, laptop or desktop computer, or wireless wall-switch; and/or based on sensor readings received from one or more remote sensors. Nowadays, the communication interface can be included directly within the lamp itself (e.g. in the end-cap of a retrofittable replacement for a filament bulb or fluorescent tube). For example this can allow a user, through the user device, to turn the lamp's illumination on and off, to dim the illumination level up or down, to change the color of the emitted illumination, and/or to create a dynamic (time varying) lighting effect. In one form, the communication interface is configured to receive the lighting control commands and/or to share sensor data via a local, short-range radio access technology such as Wi-Fi, 802.15.4, ZigBee or Bluetooth. Such lamps may sometimes be referred to as "connected" lamps.

One category of connected lamp is an instant-fit "tube LED" (TLED) lamp which retrofits into a luminaire designed for traditional fluorescent tubes.

Generally speaking, there are two types of retrofit lamps for fitting into an existing luminaire housings designed for fluorescent lamps. A first type ("Type A") is configured to be connectable to the fixed-output fluorescent ballast, lampholders and electrical wiring already existing in a luminaire. A second type ("Type B") of retrofit lamps are configured to operate when the fixed-output fluorescent ballast has been removed during the installation of the retrofit lamp, so that the retrofit lamp operates directly off the mains voltage.

There is an ongoing desire to reduce the cost and complexity of retrofit lamps for a luminaire.

SUMMARY OF THE INVENTION

The invention is defined by the claims.

According to examples in accordance with an aspect of the invention, there is provided a system of lamps for a luminaire of a lighting installation. The system of lamps comprises a master lamp and a slave lamp.

The master lamp comprises: a first light source; a first light source driver configured to control a power supplied to the first light source to thereby control one or more properties of light output by the first light source; a field generating element configured to generate an electric and/or magnetic field responsive to a voltage provided to the field generating element; and a field controller configured to control the voltage provided to the field generating element. and thereby the electric and/or magnetic field generated by the field generating element, responsive to the power supplied to the first light source.

The slave lamp comprises a second light source; a second light source driver configured to control a power supplied to the second light source to thereby control one or more properties of light output by the second light source; a field detection element configured to generate a detection signal which, when the field detection element is positioned proximate to the field generating element of the master lamp, is responsive to the electric and/or magnetic field generated by the field generating element of the master lamp, wherein the second light source driver is configured to control a power supplied to the second light source responsive to the detection signal, so that the one or more properties of light output by the second light source is responsive to a power supplied to the first light source, when the field detection element is positioned proximate to the field generating element of the master lamp.

The present disclosure therefore provides a mechanism for intra-luminaire communication from a master lamp to a slave lamp using a field generating element. In particular, the system provides a mechanism by which a controller in a master lamp can define a power supplied to a second light source of a different, slave lamp by way of an electric field.

In particular, the proposed mechanism enables a field controller to communicate with a second light source driver, which controls an operation of the second light source based on the communication. Thus, the field controller can control an operation of the second light source.

This approach means that control over multiple light sources, in different lamps, can be facilitated through appropriate operation of a single lamp.

The proposed approach uses a power supplied to a first light source to supply a voltage provided to the field generating element. This can, for example, facilitate control of the second light source responsive to the power supplied to the first light source.

Preferably, the field generating element is directly or controllably connected to a node of the first light source driver having a voltage responsive to the power provided to the light source. The voltage at this node may, for example, be controlled by the light source driver.

In some embodiments, the field controller is configured to control the electric and/or magnetic fields responsive to the power supplied to the first light source.

In some examples, the system is configured so that the second light source driver provides power to the second light source in response to the first light source driver providing power to the first light source; and the second light source driver providers no power to the second light source in response to the first light source driver providing no power to the first light source.

This embodiment can be achieved through appropriate configuration of the field controller and the second light source driver, e.g. using a suitable (predefined) communication protocol or by directly connecting the field generating element to a node of the first light source driver having a voltage that varies (in frequency and/or amplitude) based on the power supplied to the second light source.

In some embodiments, the system is configured so that the second light source driver provides the same power to the second light source as the first light source driver provides to the first light source. In other words, the second light source may be synchronized to the first light source, which increases an ease of controlling the lamps of the luminaire simultaneously. This can be achieved through appropriate configuration of the field controller and the second light source driver.

In at least one embodiments, the first light source driver comprises a switched-mode power supply, comprising one or more switches for controlling a power supplied to the first light source; the voltage provided to the field generating element is responsive to a switching performed by a switch of the first light source driver; and the field controller comprises a switch controller for the first light source driver, and is configured to control a switching of one or more switches of the first light source driver.

In other words, the field controller may be integrated into the first light source driver. The voltage provided to the field generating element may be directly responsive to a switching performed by a switch of the first light source driver (i.e. by the field controller), which means that the generated electric and/or magnetic field is directly responsive to a manner in which the first light source is controlled.

This approach provides a simple mechanism for passing information on how the first light source is controlled to the slave lamp, which can control the operation of the second light source (e.g. to match the operation of the first light source).

In some embodiments, the field controller comprises a modulation circuit configured to controllably connect the field generating element to a node of the first light source driver, to thereby control a voltage provided to the field generating element.

Thus, the field controller may selectively provide (modulate) a voltage to the field generating element. This means that the field controller may be able to control the information passed to the slave lamp, e.g. using a pulse width modulation technique or by including other modulation patterns (reflecting particular information) in the electric/magnetic field generated by the field generating element.

Preferably, the master lamp further comprises a wireless communication module configured to receive a wireless signal from an external device; and the field controller is configured to control the voltage provided to the field generating element responsive to the wireless signal received by the wireless communication module.

In this way, the information passed to the slave lamp is responsive to an external communication received by the master lamp. The master lamp may therefore effectively act as a router for the information to be passed to the slave lamp.

The field generating element may comprise metal foil and/or a metal ring that generates an electric and/or magnetic field in response to a voltage being applied thereto. Similarly, the field detection element may comprise metal foil and/or a metal ring that generates a voltage in response to an electric and/or magnetic field in the vicinity of the metal foil and/or metal ring. Metal foil and/or a metal ring provides a simple, low cost mechanism for providing a component that generates an electric field in response to a voltage and/or provides a voltage/signal in response to an electric/magnetic field. Embodiments employing these approaches therefore provide a more economic system of lamps.

Preferably, the master lamp comprises a first housing configured to house the first light source and the first light source driver, and the field generating element is mounted on the first housing. Similarly, the slave lamp may comprise a second housing configured to house the second light source and the second light source driver, and the field detection element is mounted on the second housing.

These approaches reduce an exposure of potentially sensitive components of the master/slave lamps to the electrical/magnetic field generated by the field generating element, whilst also reducing potential shielding of the generated electrical/magnetic field (to the field detection element). These approaches thereby provide a more robust and effective system of lamps.

The housing may, for example, be in the form of a tube (e.g. so that the master/slave lamp forms a TLED).

In some embodiments, the master lamp further comprises a second field generating element, different to the field generating element, configured to generate an electric and/or magnetic field responsive to a voltage provided to the second field generating element, the field controller is configured to control the voltage provided to the second field generating element and thereby the electric and/or magnetic field generated by the second field generating element.

Optionally, the field detection element is configured so that the detection signal, when the field detection element is positioned proximate to the second field generating element of the master lamp, is responsive to the electric and/or magnetic field generated by the second field generating element of the master lamp. In this way, control of the second light source can take place using one of two different field generating elements, which increases a likelihood that a field generating element of the master lamp will be in communicative contact with the field detection element.

In some embodiments, the slave lamp further comprises a second field detection element, different to the field detection element, configured to generate a second detection signal responsive to, when the second field detection element is positioned proximate to the second field generating element of the master lamp, the electric and/or magnetic field generated by the second field generating element of the master lamp, wherein the second light source driver is configured to control a power supplied to the second light source further responsive to the second detection signal, so that the one or more properties of light output by the second light source is further responsive to an operation of the second field controller. Thus, there may be two communication channels between the master lamp and the slave lamp, which can be used to control the operation of the second light source.

In some embodiments, the system comprises a first additional slave lamp, the first additional slave lamp comprising:

a first additional light source; a first additional light source driver configured to control a power supplied to the first additional light source to thereby control one or more properties of light output by the first additional light source; a first additional field detection element configured to, when positioned proximate to the second field generating element of the master lamp, generate a first additional detection signal responsive to the electric and/or magnetic field generated by the second field generating element of the master lamp, wherein the first additional light source driver is configured to control a power supplied to the first additional light source responsive to the first additional detection signal, so that the one or more properties of light output by the first additional light source is responsive to an operation of the second field controller.

In some examples, the system comprises a second additional light source comprising: a second additional light source driver configured to control a power supplied to the second additional light source to thereby control one or more properties of light output by the second additional light source; a second additional field detection element configured to, when positioned proximate to the field generating element of the master lamp, generate a second additional detection signal responsive to the electric and/or magnetic field generated by the field generating element of the master lamp, wherein the second additional light source driver is configured to control a power supplied to the second additional light source responsive to the second additional detection signal, so that the one or more properties of light output by the second additional light source is responsive to an operation of the field controller.

Some embodiments propose a luminaire comprising: any previously described system of lamps; and a luminaire housing configured to house the system of lamps.

There is also proposed a method for operating lamps for a luminaire of a lighting installation, the method comprising: controlling one or more properties of light output by a first light source of a master lamp using a first light source driver; controlling, using a field controller, a voltage provided to a field generating element of the master lamp; generating, using the field generating element, an electric and/or magnetic field responsive to the voltage provided to the field generating element, so that the field controller controls the electric and/or magnetic field generated by the field generating element; generating a detection signal using a field detection element of a slave lamp, wherein the detection signal is, when the field detection element is positioned proximate to the field generating element of the master lamp, responsive to the electric and/or magnetic field generated by the field generating element of the master lamp; and controlling, responsive to the detection signal, an intensity of a second light source of a slave lamp using a second light source driver, so that the one or more properties of light output by the second light source is responsive to an operation of the field controller, when the field detection element is positioned proximate to the field generating element of the master lamp.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
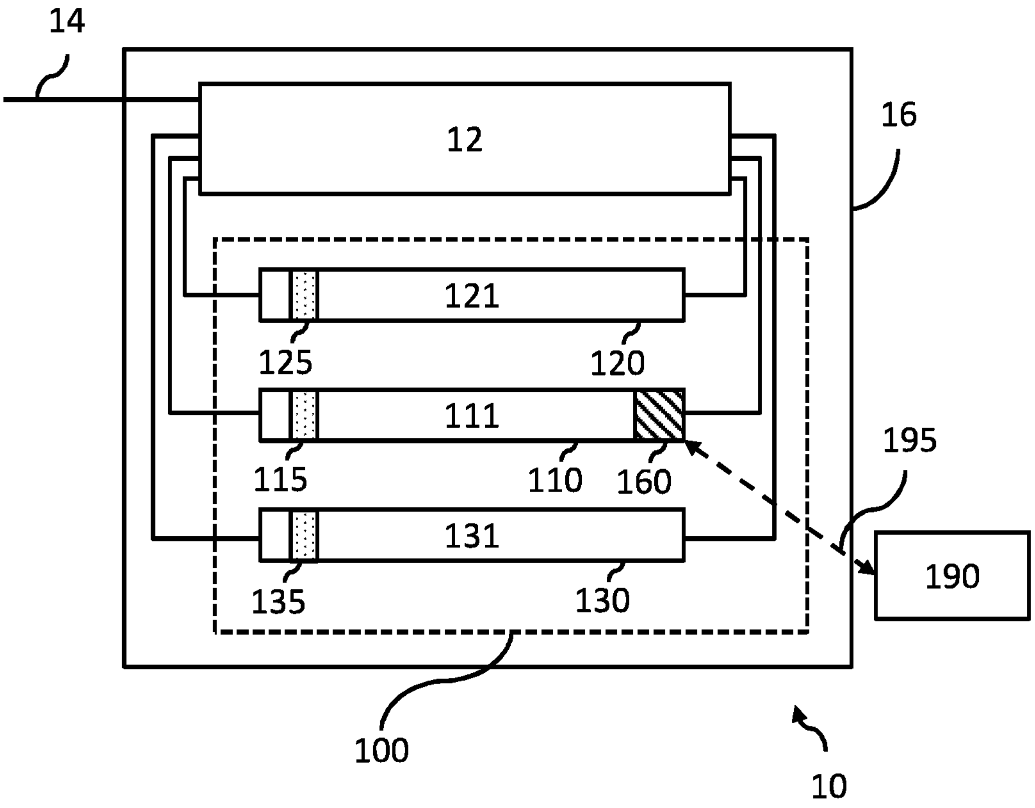
FIG. 1 illustrates a luminaire.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for lamp to lamp communication within a luminaire. This is achieved by a field controller of a master lamp controlling the magnitude of an electric/magnetic field generated by a field generating element, where a slave lamp detects the electric/magnetic field using a field detection element. One of more properties of the light output by the slave lamp are dependent upon the detected electric/magnetic field, meaning that the master lamp is able to control the operation of the slave lamp.

Embodiments of the invention are particularly suitable for lighting installations in which multiple lamps are mounted by a same luminaire, and in particular for lamps which are to be operated synchronously within a luminaire.

In the context of the present disclosure, a lamp is any module or device that comprises a light source and a light source driver. Each lamp may be individually connected to a mains supply (or other AC supply), or may share one or more components for supplying the light source driver (e.g. share a rectifying arrangement).

To facilitate ease of lamp replacement, each lamp may comprise its own housing and socket for drawing power from a mains supply (or other AC supply).

FIG. 1 is a block diagram illustrating a system 100 of lamps for a luminaire 10, according to an embodiment of the invention. The luminaire 10 is configured to house or support the system 100 of lamps.

FIG. 1 is used to explain an underlying concept of the present disclosure.

The illustrated luminaire comprises a power supply circuit 12, which connects to an upstream power supply 14 (e.g. the mains supply). The power supply circuit 12 may be configured to generate a power supply suitable for powering the system 100 of lamps. The power supply circuit may, for example, take the form of a ballast, which is a device that controls (e.g. limits) the current supplied to the system 100 of lamps in the luminaire 100.

In other examples, the power supply circuit 12 is omitted. The system 100 of lamps may instead be configured to draw power directly from the upstream power supply 14 (e.g. the mains supply).

The system of lamps 100 is mounted within a (luminaire) housing 16 of the luminaire 10. In general, the "housing" 16 may refer to any casing and/or supporting structure of the fixture. E.g. in embodiments the housing 16 may comprise an opaque upper and/or side-wall casing for mounting on the ceiling, plus a plurality of sockets mechanically connected to the upper casing, and a lower diffuser element for diffusing the illumination emitted downwards by the lamps into the environment. In another example form, the "housing" 16 may take the form of a hanging structure such as a chandelier style structure supporting a plurality of sockets (and the casing element is not necessarily present).

The system 100 of lamps comprises a plurality of lamps 110, 120, 130.

In particular, the system 100 of lamps comprises a master lamp 110 and at least one slave lamp 120, 130. Each lamp 110, 120, 130 comprises a light source 111, 121, 131 and a light source driver (not visible).

The light source driver of a lamp controls one or more properties of light output by the light source of that lamp by controlling the power provided or supplied to the light source (e.g. using a switched-mode power supply, selectively connecting additional impedances in parallel/series with the light source, selectively powering elements of the light source or the like). The one or more properties may include, for example, an ON/OFF state of the light, an intensity of light output, a color of light output, a pattern of light output, an angle of light output and so on.

An ON/OFF state can be controlled by controlling whether or not power is provided to the light source. Intensity of light output by the light source (i.e. a dimming level) can be controlled by controlling a (average) magnitude of power provided to (or drawn by) the light source. A color of light output can be controlled by, for example, controlling which elements of a light source (having elements that output light of different colors) are powered. A pattern of light output by the light source may be controlled by controlling which elements of a light source (having an array of individually controllable light elements) are powered.

Other approaches for controlling properties of a light source by controlling a power provided thereto will be apparent to the skilled person.

The master lamp 110 is configured to communicate with the at least one slave lamp 120, 130 to thereby control or influence the light intensity output by the at least one slave lamp. In other words, the master lamp 110 is configured to perform intra-luminaire communication, to communicate with a slave lamp 120, 130. The (light source driver of the) slave lamp uses the intra-luminaire communication to control the one or more properties of light output by the light source of the slave lamp.

This intra-luminaire communication between a master lamp and a slave lamp is performed wirelessly, using a field generating element 115 of the master lamp and a field detection element 125, 135 of the slave lamp.

The field generating element 115 is configured to generate an electric and/or magnetic field (e.g. an electromagnetic field). The field detection element 125, 135 of the slave lamp generates a detection signal responsive to an electric and/or magnetic field, to thereby enable the master lamp to communicate with the slave lamp 120, 130 through appropriate control of the generated electric and/or magnetic field.

The combination of the field generating element 115 and field detection elements 125, 135 thereby provide a communication channel that facilitates communication from the master lamp to a slave lamp. In particular, the master lamp 110 is able to pass or broadcast a communication to multiple slave lamps in proximity to the master lamp.

As will be later explained, the field generating element 115 is configured to generate its electric and/or magnetic field responsive to a voltage supplied to the field generating element 115. The voltage supplied to the field generating element is at least partly dependent or responsive to a voltage of a node of the light source driver, i.e. at least partly responsive to the power provided to the light source of the master lamp (and therefore of one or more properties of light output by the light source of the master lamp).

The control of the field generating element 115 may be performed by a field controller (not visible). The field controller can thereby control a communication from the master lamp to the slave lamp.

The field controller may operate according to some predetermined communication protocol or scheme, e.g. to appropriately modulate the electric and/or magnetic field based on the communication protocol or scheme. The field detection element 125, 135 and/or the light source driver of the slave lamp(s) 120, 130 may be appropriately configured to parse/interpret the information on the electric/magnetic field detected by the field detection element (e.g. operate according to the predetermined protocol or scheme).

In some examples, the field controller may be capable of providing information on current operating parameters of the master lamp to the slave lamp (e.g. information on an ON/OFF state of the light source of the master lamp or information on a power supplied to the light source of the master lamp by the light source driver of the master lamp). The field detection element and/or the light source driver of the slave lamp may be appropriately configured to control the power supplied to the light source based on (e.g. to match) the indicated operating parameters of the master lamp.

In this way, the operation of the slave lamp(s) may be synchronized to the operation of the master lamp. In particular, the light output by the slave lamp(s) 120, 130 may be synchronized to the light output by the master lamp 110.

In some examples, the master lamp 110 further comprises a wireless communication module 160, adapted to receive a wireless signal 195 from an external device 190, being a device external to the luminaire 10. The field controller may be configured to control the generated electric and/or magnetic field responsive to the received wireless signal.

In this way, the master lamp 110 can effectively act as a router for wireless communications from the external device 190 to the slave lamp 120, 130.

The external device 190 and the wireless communication module 160 may communicate using any suitable wireless communication protocol such as an infrared link, Zigbee, Bluetooth, a wireless local area network protocol such as in accordance with the IEEE 802.11 standards, a 2G, 3G, 4G or 5G telecommunication protocol, and so on. Other formats will be readily apparent to the person skilled in the art.

This approach means that only one lamp with wireless communication capability (the master lamp 110) is required for a system 100 of lamps of a luminaire 10 to communicate with an external device (e.g. an external lighting control system) outside the luminaire (e.g., via ZigBee). This reduces the required number of wireless communication modules, saving cost and resources (e.g. bandwidth) as only one node per system of lamps is required for external communications.

The proposed mechanism also avoids any need for control or communication wires to connect lamps in a luminaire.

From the foregoing, it will be clear that the (light output by the) master lamp 110 and the slave lamp(s) 120, 130 may be adapted to operate effectively synchronously or individually/separately.

In particular, the system may, in some examples, be configured (or configurable) to control one or more properties of the light output by the slave lamp(s) to match one or more properties the light output by the master lamp, through appropriate control of the electric/magnetic field.

This approach enables a luminaire to effectively be treated as a single lamp, thereby simplifying a control process of the system of lamps.

In other examples, the system may be configured to control the light output by the slave lamp(s) independently of the light output by the master lamp. This may, for example, enable an external device to individually control the light output by the master lamp and the light output by the slave lamp, without the need to directly communicate with the slave lamp. This approach reduces a number of wireless communication modules that are required.

More than one slave lamp 120, 130 may be configured to control the light output (by the slave lamp) based on the field generated by the master lamp.

The master lamp 110 and the at least one slave lamp 120, 130 are preferably arranged within the luminaire so that the field generating element 115 and the field detection element 125, 1353 are proximate to one another (e.g. positioned at a same end of the luminaire). This improves a reception of the signal from the master lamp to the slave lamp.

Where the luminaire comprises two or more slave lamps 120, 130, the master lamp may be positioned to lie between the two or more slave lamps, e.g. so that the distance between each slave lamp and the master lamp is as close to an average distance between all slave lamps and the master lamps as possible. In the illustrated example, the master lamp 110 is positioned between the two slave lamps 120, 130.

This further improves a reception of the signal from the master lamp to the slave lamp(s).

In some examples, the field generating element may be configurable to act as a field detection element, and the field detection element may be configurable to act as a field generating element (e.g. a same field element may switch between acting as a field generating element and a field detection element). This approach can facilitate communication from the slave lamp(s) to the master lamp, and will be explained in more detail later.

Figure 2:
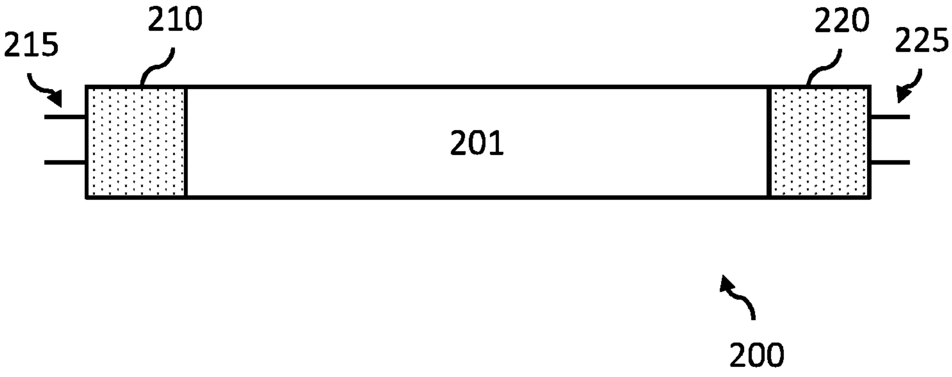
FIG. 2 illustrates a lamp.

FIG. 2 provides an overview of an individual lamp 200, which may represent any of the lamps 110, 120, 130 of the luminaire 10 described in relation to FIG. 1.

The lamp 200 comprises a light source 201. The illustrated light source is formed as a tubular light source, e.g. so that the lamp 200 is suitable for replacing a florescent tube. The light source 201 may comprise, for example, a string or array of LEDs. In other examples, the light source comprises one or more conventional bulbs (e.g. a halogen light source or the like).

The lamp 200 further comprises at least one end-cap 210, 220.

Each end-cap 210, 220 comprises a respective connector 215, 225 for connecting the lamp to a power supply provided by the luminaire (e.g. to the ballast or mains power supply, as previously explained). In the illustrated example, the connector 215, 225 comprises two terminals (a pair of pins). This facilitates retro-fitting into existing sockets for fluorescent lamps of existing luminaires.

At least one end-cap 210, 220 is further configured to house additional electronic components for the lamp, such as a light source driver, a fuse, an EMI filter and so on. The electronic components may, for example, be configured to convert the power supplied to the lamp (designed for powering a conventional lamp such as a fluorescent tube) into power suitable for driving the light source of the lamp (e.g. an LED array or string), and/or provide protection capability to the lamp 200.

The lamp 200 of the illustrated embodiment further comprises a field element, such as some metal foil and/or a metal ring, positioned on or integrated in a housing of the lamp 200, e.g. on or in the end cap 210, 220. The field element can act as the field generating element and/or the field detection element. In particular, when a voltage is applied to the field element, an electric or magnetic field is generated. Similarly, when exposed to an electric or magnetic field, a voltage is induced in the field element, which can be detected.

Thus, the communication channel between a master lamp and a slave lamp is provided via an electric field between end caps of the lamps.

In some examples, each end-cap 210, 220 of a lamp comprises a field element (e.g. connected together). This can make the operation of the field generating element and/or the field detection element independent of the orientation of the lamp 200 (within the luminaire).

The field element is connected to the internal circuitry of the end-cap. In particular, the voltage provided to the field element (if acting as a field generating element) is at least partially responsive to a power provided to the light source 201.

The skilled person would appreciate that metal foil and/or a metal ring is only one example of a field element, and it could be replaced by any other suitable element that responds to a voltage (to generate an electric/magnetic field) or an electric/magnetic field (to generate a voltage).

The end cap may also comprise, e.g. if the lamp is a master lamp, a wireless communication module for communicating with an external device. Other electronic components for positioning within the end-cap of a lamp would be apparent to the skilled person.

Figure 3:
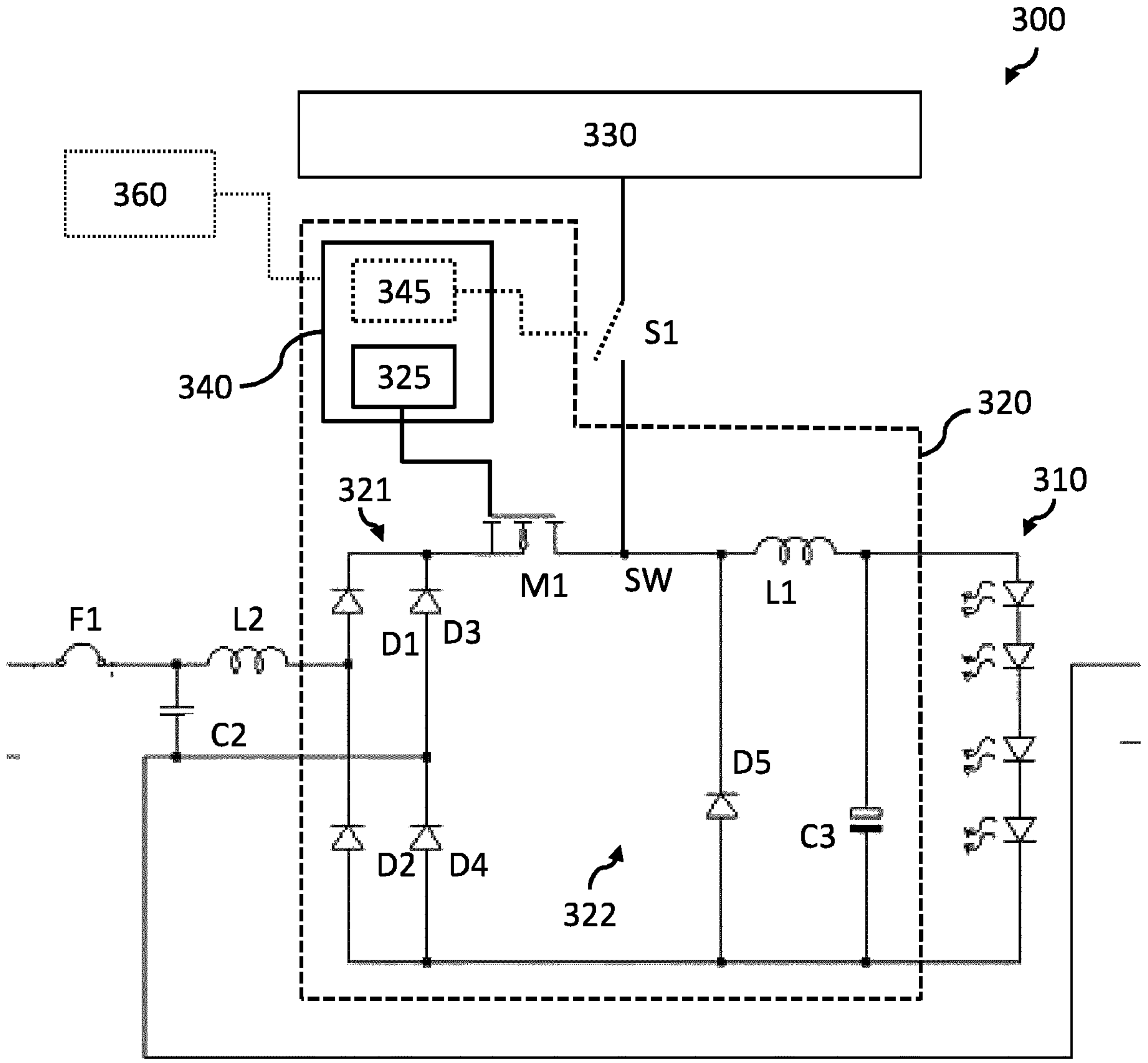
FIG. 3 is a circuit diagram for a master lamp.
Figure 4:
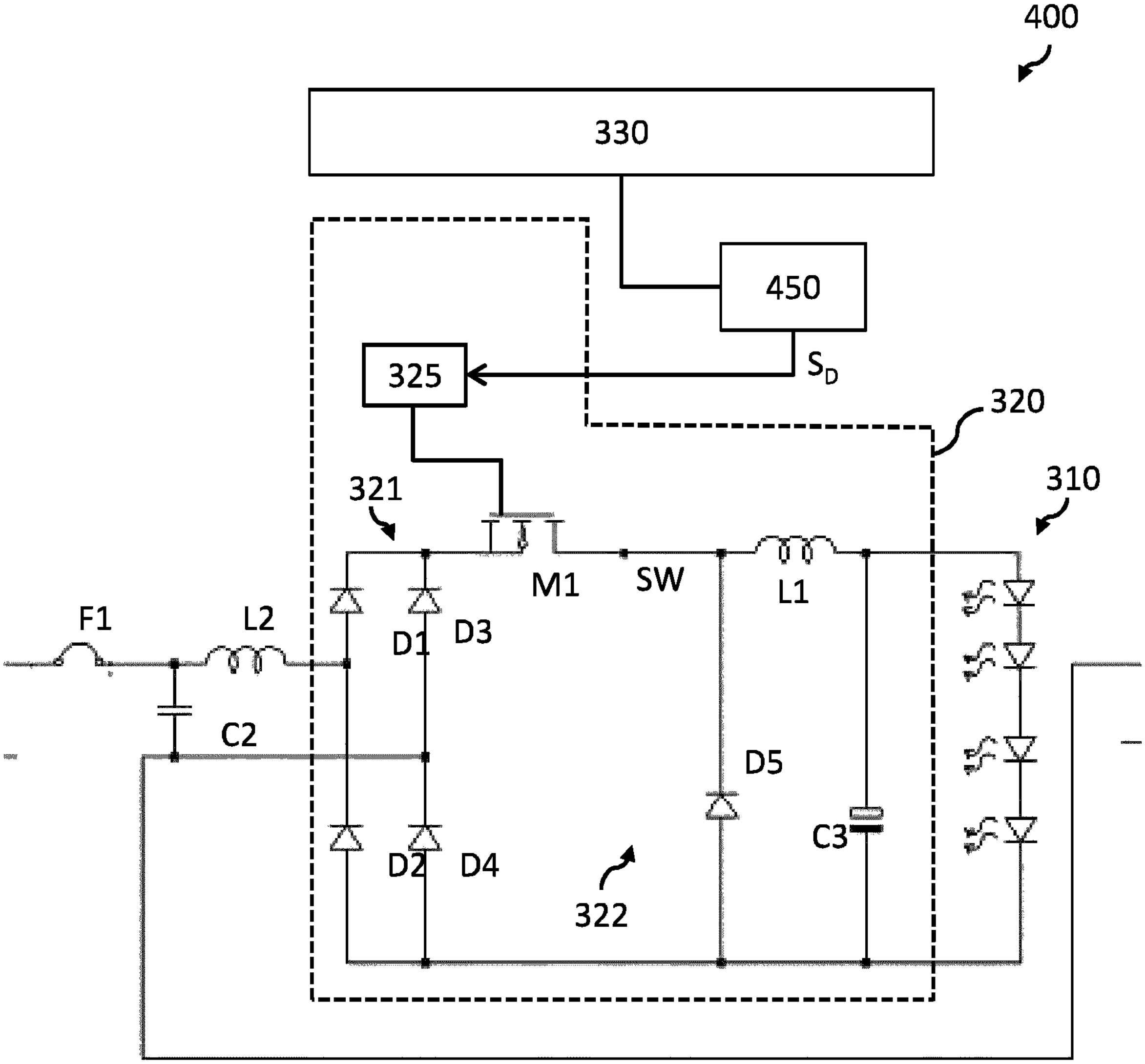
FIG. 4 is a circuit diagram for a slave lamp.
Figure 5:
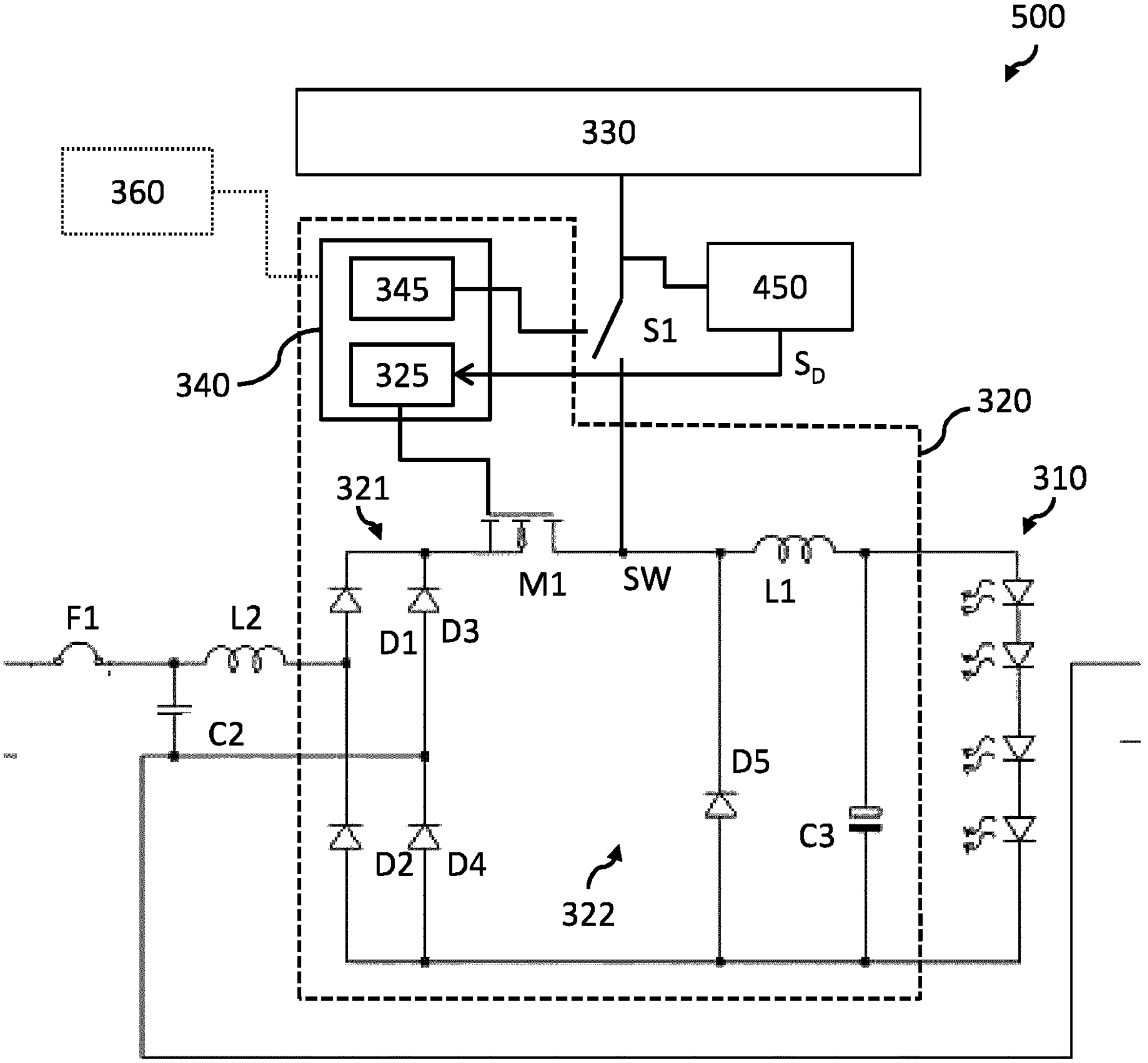
FIG. 5 is a circuit diagram for a lamp.

FIGS. 3, 4 and 5 provide circuit diagram for lamps 300, 400, 500 according to an embodiment of the invention. FIG. 3 illustrates a master lamp according to an embodiment. FIG. 4 illustrates a slave lamp according to an embodiment. FIG. 5 illustrates a lamp that can act as a master and/or a slave lamp, depending upon the configuration.

Starting with FIG. 3, a master lamp 300 is illustrated.

The master lamp 300 comprises a light source 310, here embodied as an LED array or LED string.

The master lamp 300 further comprises a light source driver 320. A controller 325 of the light source driver 320 controls the power supplied to the light source. In particular, the light source driver is configured to control one or more properties of the light output by the light source (e.g. a color, pattern, intensity, angle and so on of light output), e.g. in the manner previously described.

As illustrated, the light source driver 320 preferably comprises a switched-mode power supply (SMPS) to control the power supplied to the light source.

The illustrated light source driver comprises a buck switching mode circuit (an example of a switched-mode power supply). Diodes D1, D2, D3 and D4 form a rectifying arrangement 321 (here: a diode bridge) for rectifying an AC supply provided to the light source driver 320. A buck circuit 322 is formed from a switch M1 (e.g. a transistor such as a MOSFET or BJT), inductive element L1 and diode D5.

The lamp may further comprise an input fuse F1, and an EMI filter 323 formed from an inductive element L2 and a capacitive element C2.

A smoothing capacitor C3 (of the light source driver) acts to smooth the voltage provided to the light source, i.e. output by the buck circuit.

In the illustrated example, the controller 325 controls the operation of the switch M1 of the buck circuit 322 to control a power supplied to the light source 310.

Although the illustrated embodiment provides an example of a light source driver employing a buck switching mode circuit to control the power provided to a light source, the skilled person would appreciate other methods and techniques for controlling the power provided to a light source (e.g. use of a boost circuit, a buck-boost circuit or any other switched mode power supply).

The master lamp 300 further comprises a field element 330. As previously described, the field element 330 may be integrated in or mounted on a housing (not visible) of the lamp 300, e.g. in an end cap of the lamp.

The field element is any suitable element that element that responds to a voltage (to produce a corresponding electric/magnetic field) or an electric/magnetic field (to produce a corresponding voltage). The field element may, for example, comprise metal foil and/or a metal ring, as previously described, although other examples will be apparent to the skilled person.

An electric/magnetic field generated by the field element 330 of the master lamp can be detected by another (e.g. slave) lamp. The present disclosure recognizes that this mechanism facilitates a communication to take place from the master lamp 300 to another (e.g. slave) lamp through appropriate control of the electric/magnetic field.

Accordingly, the master lamp 300 comprises a field controller 340.

The field controller 340 is configured to control a voltage supplied to the field element 330. The voltage supplied to the field element 330 is at least partly responsive to a power supplied to the first light source.

This can be achieved by directly or selectively (i.e. controllably) connecting the field element to a node of the light source driver whose voltage (amplitude and/or frequency) is dependent upon the power supplied to the light source, e.g. a switching node SW.

Preferably, the light source driver is a switched mode power supply, and the node to which the field element is directly/selectively connected is a high frequency switching node SW of the switched mode power supply. The switching node SW may, for example, be a node whose voltage is dependent upon the switching of the switched mode power supply.

In a first example, illustrated in FIG. 3, the field element 330 is selectively connected by the field controller 340 (e.g. via a switch S1, such as a MOSFET or BJT) to a node of the light source driver whose voltage is dependent upon the power supplied to the light source, such as the switching node SW.

The selective connection enables the field controller 340 to modulate the voltage provided to the field element 330, e.g. according to some communication protocol, to enable the electric/magnetic field generated by the field element 330 to be directly controlled by the field controller.

In some examples, the field controller 340 comprises a modulation circuit 345 configured to controllably connect the field element 330 to a node of the first light source driver, e.g. via a switch S1, to thereby control a voltage provided to the field generating element. The node may be the switching node SW previously identified.

In this way, the field controller can modulate an electric/magnetic field generated by the field element 330, to thereby control a communication with another lamp. In particular, appropriate modulation can enable messages or instructions to be conveyed in the electric field.

In this first example, the communication to the other lamp can be independent of the operation of the light source of the master lamp.

To reduce electromagnetic interference, it is preferred that the field controller controls the switch S1 to remain in an OFF mode (i.e. disconnect the field element 330 from the switching node SW) when there is no lamp-to-lamp communication taking place.

In a second example, the field element 330 is directly connected to a node of the light source driver whose voltage is dependent upon the power supplied to the light source, e.g. the switching node SW (i.e. the switch S1 is omitted). In this way, the electric field is dependent only upon the power supplied to the light source (e.g. and no further control elements).

In this way, the electric/magnetic field varies with a frequency that can be used to derive a dimming level of the first lamp, as the switching frequency at the switching node is dependent on the amount of power provided to the first lamp. This can result in information about the operation of the light source 310, e.g. properties of the light output by the light source, of the master lamp being communicated in the electric field.

This could enable, for example, a different lamp (e.g. a slave lamp) to identify one or more properties of the light output by the light source of the master lamp and configure its own operation so that the light output by the different light matches (or is based on) one or more properties of the light output by the master lamp.

In this second example, the controller 325 of the light source driver 320 forms an aspect of the field controller 340.

A combination of the first and second examples may be used. Thus, the field controller may control both a power supplied to the light source of the master lamp (via the controller 325) and selectively connect the field element 330 to a node of the light source driver (e.g. via a switch S1). This can allow for more dynamic communication (and control) of other lamps.

For the purposes of the master lamp 300, the field element 330 effectively acts a field generating element.

In some embodiments the field element 330 may be an integral part of the light source driver 320 for example a trace on the printed circuit board, or even physically not necessary because the metal parts of switch M1 package may itself act as a field element.

Thus, in some embodiments, the field element 330 (for at least the master lamp) may be formed as an aspect of existing circuity and/or electronic components/housing of the light source driver or other elements of the master lamp. It is recognized that the electrical field generated by the master lamp may be already sufficient for the slave lamps to detect. This provides a lamp system having an even lower cost approach.

The skilled person will appreciate that, for such example, the previously described second example of a controller may be used (rather than the first example).

The operation of the field controller 340 may be responsive to a wireless signal received by a wireless communication module 360. In this way, an external device (not shown) can control the electric/magnetic field and thereby control the operation of a lamp responsive to the electric/magnetic field. Example wireless communication modules have been previously described, e.g. with reference to FIG. 1, and may be adapted for use as the wireless communication module 360.

Of course, the controller 325 of the light source driver may also be responsive to the wireless signal, so that the external device can control one or more properties of the light output by the light source of the master lamp 300. In other words, one or more properties of light output by the light source of the lamp may be responsive to the wireless signal received at the wireless communication module 360.

FIG. 4 illustrates a slave lamp 400 according to an embodiment of the invention. The slave lamp 400 differs from the master lamp 300, described in FIG. 3, in that it does not comprise a field controller 340 (or switch S1) or wireless communication module 360.

Instead, the slave lamp 400 comprises a field detection element 450.

The field detection element 450 is configured to generate a detection signal SD responsive to a voltage at the field element 330. Thus, when an electric/magnetic field induces a voltage in the field element 330, this can be detected by the field detection circuit and indicated by a detection signal.

The controller 325 of the light source driver 320 for the slave lamp 300 is further configured to control the power provided to the light source 310 responsive to the detection signal $S_D$. In this way, the field controller of a master lamp (such as that illustrated in FIG. 3) controls or influences the light output by the light source of a slave lamp, via the electric/magnetic field which is detected by the field detection element 450.

In particular, the detection element 450 may translate the voltage induced at the field element 330 (by an electric field) into one or more lamp control signals (for example, dimming and ON/OFF signal in the form of one or more PWM signals) which are provided to the controller 325 of the light source driver 320 to control the power provided to the light source 310, e.g. through appropriate control of the switch M1.

The translation of the voltage received at the field element may depend upon how the electric field is generated by the master device and will differ depending upon the implementation details. The skilled person will appreciate that the operation of the master and slave device is complimentary, and therefore dependent upon the specific implementation.

For example, it may be desired for the control of light output by the slave lamp to match or mirror the control of light output by the master lamp. In this scenario, the field element of the master lamp may be directly connected to the node having a voltage responsive to a power provided to the light source (i.e. the electric field produced by the master lamp is directly responsive to (or representative of) one or more properties of light output by the light source of the master lamp). The operation of the light source driver of the slave lamp may thereby be made directly dependent upon the power provided to the light source (e.g. by detecting when the master light source is turned on, which will induce a change in the electric field, or to detect a power provided to the light source of the master lamp, by detecting the magnitude or switching frequency of the electric field). This information can be used to control the light source of the slave lamp to match that of the master lamp.

As another example, the electric/magnetic field may be controlled or modulated by the field controller of the master device to pass control messages from the master lamp to the slave lamp, e.g. using some predetermined communication protocol. The detection element and/or the light source driver of the slave lamp may analyze the changes in the electric/magnetic field and determine, based on the known predetermined communication protocol, how to control the properties of the light source of the slave lamp.

Various communication protocols or schemes could be used to communicate from the master lamp to the slave lamp.

As a simple example, a duration of an electric/magnetic field (e.g. a time period for how long a detected magnitude of the electric/magnetic field is above a predetermined threshold) could be used to define some property of the light source (e.g. a dimming level). As another example, a certain modulation pattern in the electric/magnetic field can be used to define some other property of the light source (e.g. an ON/OFF state or color of the light source). Other examples would be readily apparent to the skilled person.

The control by the field controller of the master lamp may be responsive to a wireless signal receive by a wireless communication module, as previously described. Thus, the light source of the slave lamp can be controlled by a device external to the luminaire (e.g. a lighting control system), without needing to itself communicate with the external device (as control can be routed via the master lamp).

The previously described embodiments of the lamp 300, 400 provide fairly simplistic examples in which the master lamp comprises a field controller (but no field detection element) and the slave lamp comprises a field detection element (but no field controller). Thus, there is only one-way communication from the master lamp to the slave lamp via the electric field generated by the master lamp.

Thus, in the previously described examples, for a master lamp, the field element 330 may be connected only to a field controller, and for a slave lamp, the field element 330 may be connected only to a field detection element (or form part of a field detection element).

However, in some embodiments, both the master lamp and the slave lamp comprise a field controller and a field detection element. This can facilitate two-way communication between the master lamp and the slave lamp.

In these configurations, the field element can act as either the field generating element (e.g. for sending a communication) or as an aspect of the field detection element (e.g. for receiving a communication).

FIG. 5 illustrates a lamp 500 which is capable of both transmitting a communication using an electric/magnetic field and receiving a communication through detecting an electric/magnetic field.

The lamp 500 combines elements of the master lamp 300, described with reference to FIG. 3, and the slave lamp 400, described with reference to FIG. 4. The lamp 500 may thereby act as either a master or a slave lamp.

Selection of whether a field element 330 operates as a field generating element (to transmit communications) or a field detection element (to receive communications) may be controlled by appropriately switching a connection of the field element 330.

In the illustrated example, this control is achieved by the field controller 340 selectively connecting the field element 330 to the node SW of the light source driver (to make the field element 330 act as a field generating element) or disconnecting the field element from this node (to make the field element as an aspect of a field detection element).

This approach facilitates simple control over the operation of the field element, without needing additional components.

It will be appreciated that detection of the electric/magnetic field (in the vicinity of the field element) may only be possible when the electric/magnetic field is disconnected from the light source driver (e.g. the field element 330 is disconnected from the switching node SW). This is because any induced voltage in the field element (by an electric field) will be hidden by a voltage applied to the field element (to generate an electric field).

In another example, a switching circuit may be disposed between the field element and the remaining components of the lamp 500, and can control whether the field element 330 is connected to the detection element 450 or the field controller 340, to thereby control whether the field element acts as the field generating element or as an aspect of the field detection element.

Previous embodiments have been explained in the context of lamps that generally comprise only a single field element (which can act as a field generating element and/or a field detection element, e.g. depending upon whether the lamp is a slave lamp or a master lamp).

However, some lamps may comprise more than one field element, which can be controlled/operated synchronously or individually. These field elements may, for example, be positioned at different locations with respect to the overall lamp (e.g. at opposite ends of the lamp).

In one example, these field elements may be controlled or operated synchronously (e.g. connected together). This can make the operation of the lamp (whether as a master or slave) less dependent upon the orientation of the lamp within the luminaire.

In other examples, these field elements are separately controllable, to facilitate communication with multiple other lamps or over multiple communication channels (e.g. with a single lamp).

Consider a first scenario in which a master lamp comprises two separate field generating elements (which are separately controllable).

In particular, in this first scenario, the master lamp comprises: a first light source; a first light source driver configured to control a power supplied to the first light source to thereby control one or more properties of light output by the first light source; a field generating element configured to generate an electric and/or magnetic field responsive to a voltage provided to the field generating element; a second field generating element, different to the field generating element, configured to generate an electric and/or magnetic field responsive to a voltage provided to the second field generating element; a field controller configured to control the voltage provided to the field generating element, and thereby the electric and/or magnetic field generated by the field generating element, to control the voltage provided to the second field generating element and thereby the electric and/or magnetic field generated by the second field generating element, wherein the voltage provided to the field generating element and the second field generating element is at least partly responsive to the power supplied to the first light source.

In a first example of this first scenario, a first field generating element may be used to communicate with a first slave lamp, and the second field generating element may be used to communicate with a second, different slave lamp.

Thus, a system of lamps may comprise a first additional lamp comprising: a first additional light source; a first additional light source driver configured to control a power supplied to the first additional light source to thereby control one or more properties of light output by the first additional light source; a first additional field detection element configured to, when positioned proximate to the second field generating element of the master lamp, generate a first additional detection signal responsive to the electric and/or magnetic field generated by the second field generating element of the master lamp, wherein the first additional light source driver is configured to control a power supplied to the first additional light source responsive to the first additional detection signal, so that the one or more properties of light output by the first additional light source is responsive to an operation of the second field controller.

In a second example of this first scenario, the two field generating elements may be used to communicate with a same slave lamp, but over different communication channels. Thus, a first field generating element may be employed as a first communication channel and the second field generating element may be employed a second communication channel between the master lamp and the slave lamp.

In these circumstances, one field element may be transmitting a communication to the slave lamp(s), via the first field generating element, whilst another field element may be receiving a communication from a slave lamp(s), via the second field generating element.

The presence of more than one field element in a lamp can also facilitate determination of other information about the lamp or another lamp in the luminaire.

For example, the field elements may be used to determine the orientation of two adjacent lamps with respect to each other. Knowing the relative orientation between two lamps is beneficial if, for example, the light source of each lamp comprises a pixelated TLEDs for advanced lighting scenes.

In addition, knowing at which end of the TLED the wireless communication module is installed (e.g. based a determined orientation of a lamp) may be beneficial for accurate beacon based (e.g. Bluetooth beacon) asset tracking because an installer can more accurately map the position of the wireless communication module.

Figure 6:
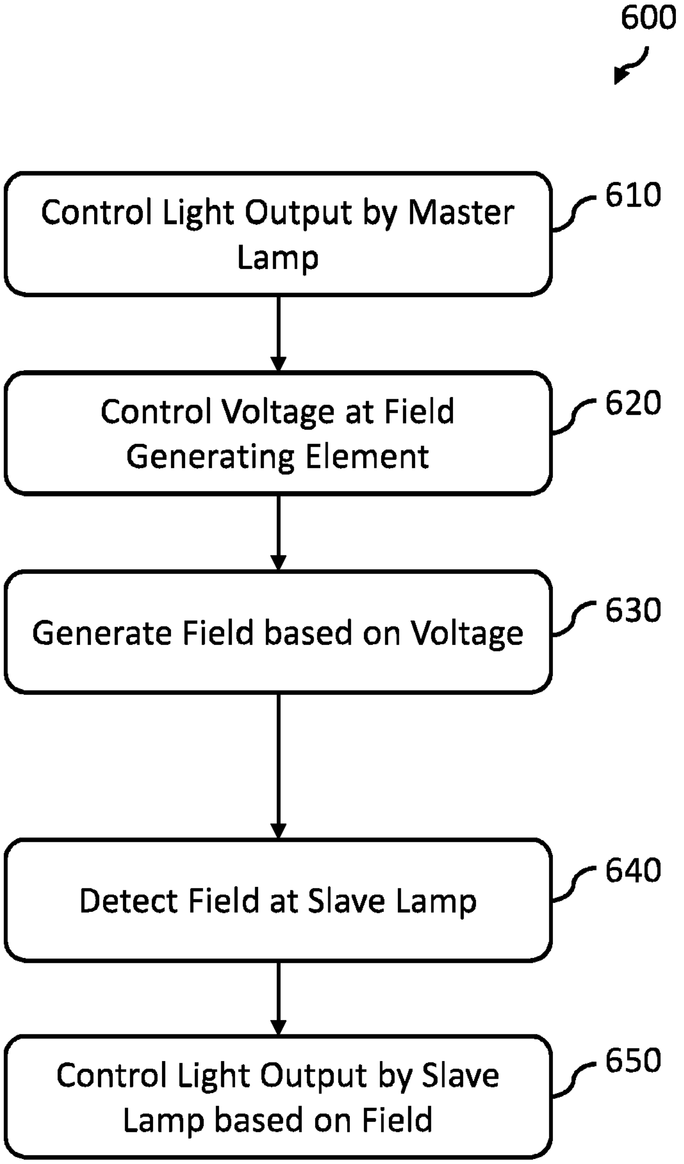
FIG. 6 is a flow chart illustrating a method.

FIG. 6 is a flow chart illustrating a method for operating lamps for a luminaire of a lighting installation.

The method 600 comprises a step 610 of controlling one or more properties of light output by a first light source of a master lamp using a first light source driver.

The method also comprises a step 620 of controlling, using a field controller, a voltage provided to a field generating element of the master lamp.

The method 600 also comprises a step 630 of generating, using the field generating element, an electric and/or magnetic field responsive to the voltage provided to the field generating element, so that the field controller controls the electric and/or magnetic field generated by the field generating element.

The method 600 also comprises a step 640 of generating a detection signal using a field detection element of a slave lamp, wherein the detection signal is, when the field detection element is positioned proximate to the field generating element of the master lamp, responsive to the electric and/or magnetic field generated by the field generating element of the master lamp.

The method 600 also comprises a step 650 of controlling, responsive to the detection signal, an intensity of a second light source of a slave lamp using a second light source driver, so that the one or more properties of light output by the second light source is responsive to an operation of the field controller, when the field detection element is positioned proximate to the field generating element of the master lamp.

Steps 610-630 are performed at the master lamp. Steps 640-650 are performed at the slave lamp. The method 600 may be adapted to carry out any mechanism described with reference to FIGS. 1 to 5 and would be readily apparent to the skilled person.

Any herein described lamp may, by itself, be an embodiment of the invention. Thus, there may be provided a slave lamp for a system of lamps (as above described) and/or a master lamp for a system of lamps (as above described).

The skilled person will appreciate that there are other possibilities for controlling the power provided to the light source, other than the switched mode power supply approach illustrated in the Figures. For example, the light source and/or light source driver may stay connected in circuit and not be completely shorted, but a switchable or variable resistance or impedance may be included in series or in parallel with the light source and/or light source driver 24, and the controller may control this switchable or variable resistance or impedance in order to modulate the power provided to the light source. Or more generally, other power line communication techniques may be available to a person skilled in the art. Moreover, the disclosed technique of modulating the power may be applied not just in the context of a ballast, but any other power supply circuit, e.g. a circuit comprising a transformer.

Ordinal numbers (e.g. "first", "second" and so on) have been used throughout this disclosure to label different elements of various embodiments for the sake of improved clarity. However, the presence of an ordinal number greater than one (e.g. "second" or "third") in a label for an element does not mean that an element having a lower ordinal number needs to be present. Thus, a "second element" does not necessitate that a "first element" needs to be present. The skilled person would be capable of relabeling such higher ordinal numbered elements (e.g. relabeling a "second element" as a "first element") for improved clarity.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to".

Any reference signs in the claims should not be construed as limiting the scope.

The invention claimed is:

1. A system of lamps comprising:

a master lamp operatively connectable to a common power supply, the master lamp comprising:
- a first light source;
- a first light source driver configured to control a power supplied from the common power supply to the first light source to thereby control one or more properties of light output by the first light source;
- a field generating element different from the first light source and configured to generate an electric and/or magnetic field responsive to a voltage provided to the field generating element; and
- a field controller configured to control the voltage provided to the field generating element and thereby the electric and/or magnetic field generated by the field generating element, wherein the voltage provided to the field generating element is at least partly responsive to the power supplied to the first light source, wherein the field controller comprises a switch (S1) and a modulation circuit configured to controllably and selectively connect the field generating element to a node of the first light source driver, to thereby control the voltage provided to the field generating element; and a slave lamp operatively connectable to the common power supply, the slave lamp comprising:
- a second light source;
- a second light source driver configured to control a power supplied from the common power supply to the second light source to thereby control one or more properties of light output by the second light source;
- a field detection element configured to generate a detection signal (SD) which, in the event that the field detection element is positioned proximate to the field generating element of the master lamp, is responsive to the electric and/or magnetic field generated by the field generating element of the master lamp;

wherein the second light source driver is configured to control a power supplied to the second light source responsive to the detection signal, so that the one or more properties of light output by the second light source is controllable by the field controller when the field detection element is positioned proximate to the field generating element of the master lamp.

2. The system of lamps according to claim 1, configured so that:
- the second light source driver is adapted to provide power to the second light source in response to the first light source driver providing power to the first light source; and
- the second light source driver is adapted to provide no power to the second light source in response to the first light source driver providing no power to the first light source.

3. The system of lamps according to claim 1, wherein the second light source driver is adapted to provide the same power level to the second light source as the first light source driver provides to the first light source.

4. The system of lamps according to claim 1, wherein:
- the first light source driver comprises a switched-mode power supply, comprising one or more switches (M1) for controlling the power supplied to the first light source;
- the voltage provided to the field generating element is responsive to a switching performed by the one or more switches of the first light source driver; and
- the field controller comprises a switch controller for the first light source driver, and is configured to control a switching of the one or more switches of the first light source driver.

5. The system of lamps according to claim 1, wherein:
- the master lamp further comprises a wireless communication module configured to receive a wireless signal from an external device; and
- the field controller is further configured to control the voltage provided to the field generating element responsive to the wireless signal received by the wireless communication module.

6. The system of lamps according to claim 1, wherein:
- the field generating element comprises metal foil and/or a metal ring that is adapted to generate the electric and/or magnetic field in response to the voltage being applied thereto; and/or the field detection element comprises metal foil and/or a metal ring that is adapted to generate the voltage in response to an electric and/or magnetic field in the vicinity of the metal foil and/or metal ring.

7. The system of lamps according to claim 1, wherein:

the master lamp comprises a first housing configured to house the first light source and the first light source driver, and the field generating element is mounted on the first housing; and/or the slave lamp comprises a second housing configured to house the second light source and the second light source driver, and the field detection element is mounted on the second housing.

8. The system of lamps according to claim 1, wherein:

the master lamp further comprises a second field generating element, different to the field generating element, configured to generate an electric and/or magnetic field responsive to a voltage provided to the second field generating element, and the field controller is configured to control the voltage provided to the second field generating element and thereby the electric and/or magnetic field generated by the second field generating element, wherein the voltage provided to the second field generating element is at least partly responsive to the power supplied to the first light source.

9. The system of lamps according to claim 8, wherein the detection signal, when the field detection element is positioned proximate to the second field generating element of the master lamp, is responsive to the electric and/or magnetic field generated by the second field generating element of the master lamp.

10. The system of lamps according to claim 9, wherein:

the slave lamp further comprises a second field detection element, different to the field detection element, configured to generate a second detection signal responsive to, when the second field detection element is positioned proximate to the second field generating element of the master lamp, the electric and/or magnetic field generated by the second field generating element of the master lamp, wherein the second light source driver is configured to control a power supplied to the second light source further responsive to the second detection signal, so that the one or more properties of light output by the second light source is further responsive to an operation of the second field controller.

11. The system of lamps according to claim 9, further comprising a first additional slave lamp, the first additional slave lamp comprising:

a first additional light source;

a first additional light source driver configured to control a power supplied to the first additional light source to thereby control one or more properties of light output by the first additional light source;

a first additional field detection element configured to, when positioned proximate to the second field generating element of the master lamp, generate a first additional detection signal responsive to the electric and/or magnetic field generated by the second field generating element of the master lamp, wherein the first additional light source driver is configured to control a power supplied to the first additional light source responsive to the first additional detection signal, so that the one or more properties of light output by the first additional light source is responsive to an operation of the second field controller.

12. The system of lamps according to claim 1, further comprising a second additional slave lamp, the second additional slave lamp comprising:

a second additional light source;

a second additional light source driver configured to control a power supplied to the second additional light source to thereby control one or more properties of light output by the second additional light source;

a second additional field detection element configured to, when positioned proximate to the field generating element of the master lamp, generate a second additional detection signal responsive to the electric and/or magnetic field generated by the field generating element of the master lamp, wherein the second additional light source driver is configured to control a power supplied to the second additional light source responsive to the second additional detection signal, so that the one or more properties of light output by the second additional light source is responsive to an operation of the field controller.

13. A luminaire comprising:

a system of lamps according to claim 1; and a luminaire housing configured to house the system of lamps.

14. The system of lamps according to claim 1, wherein the master lamp and the slave lamp are operatively connected to the common power supply via a power supply circuit configured to receive an AC power supply.

15. The system of lamps according to claim 1, wherein the common power supply is an AC power supply.

16. The system of lamps according to claim 15, wherein the common power supply is a mains supply.

* * * * *